US011466992B2

(12) United States Patent
Gao et al.

(10) Patent No.: US 11,466,992 B2
(45) Date of Patent: Oct. 11, 2022

(54) METHOD, APPARATUS, DEVICE AND MEDIUM FOR DETECTING ENVIRONMENTAL CHANGE

(71) Applicant: Beijing Baidu Netcom Science and Technology Co., Ltd., Beijing (CN)

(72) Inventors: Hang Gao, Beijing (CN); Wendong Ding, Beijing (CN); Shenhua Hou, Beijing (CN); Guowei Wan, Beijing (CN); Shiyu Song, Beijing (CN)

(73) Assignee: Beijing Baidu Netcom Science and Technology Co., Ltd., Beijing (CN)

(*) Notice: Subject to any disclaimer, the term of this patent is extended or adjusted under 35 U.S.C. 154(b) by 267 days.

(21) Appl. No.: 16/806,445

(22) Filed: Mar. 2, 2020

(65) Prior Publication Data
US 2021/0270613 A1 Sep. 2, 2021

(51) Int. Cl.
G01C 21/32 (2006.01)
G05D 1/00 (2006.01)
G05D 1/02 (2020.01)

(52) U.S. Cl.
CPC .......... *G01C 21/32* (2013.01); *G05D 1/0088* (2013.01); *G05D 1/0274* (2013.01); *G05D 2201/0213* (2013.01)

(58) Field of Classification Search
CPC ................ G01C 21/32; G01C 21/3859; G01C 21/3863; G05D 1/0088; G05D 1/0274; G05D 2201/0213
See application file for complete search history.

(56) References Cited

U.S. PATENT DOCUMENTS 9,014,970 B2 * 4/2015 Oi ............................ G06T 7/60
701/450
10,584,971 B1 * 3/2020 Askeland ............... G01C 21/32
(Continued)

FOREIGN PATENT DOCUMENTS

CN 108921947 A 11/2018
CN 109064506 A 12/2018
(Continued)

OTHER PUBLICATIONS

Luft et al.; Detecting Changes in the Environment Based on Full Posterior Distributions Over Real-Valued Grid Maps; IEEE Robotics and Automation Letters, vol. 3, No. 2; Apr. 2018; pp. 1299-1305 (Year: 2018).*

(Continued)

*Primary Examiner* — Michael J Zanelli
(74) *Attorney, Agent, or Firm* — Seed IP Law Group LLP

(57) ABSTRACT

The present disclosure provides a method, an apparatus, a computing device and a computer readable storage medium for detecting an environmental change, and relates to the field of autonomous driving. The method obtains a global map for an area and a first local map built in real time for a sub-area in the area; and determines an environmental change in the first sub-area by comparing the first local map and the global map and determining a first probability of the environmental change. Techniques of the present disclosure can automatically detect environmental changes that affect the positioning of autonomous driving, thereby facilitating the updating of positioning maps.

17 Claims, 3 Drawing Sheets

(56) References Cited

U.S. PATENT DOCUMENTS

| | | |
|---|---|---|
| 11,092,445 B2 | 8/2021 | Hasberg et al. |
| 2017/0248963 A1 | 8/2017 | Levinson et al. |
| 2019/0084577 A1 | 3/2019 | Nobre et al. |
| 2020/0249670 A1 | 8/2020 | Takemura et al. |

FOREIGN PATENT DOCUMENTS

| | | | | |
|---|---|---|---|---|
| CN | 109141437 A | * | 1/2019 | ............ G01C 21/20 |
| CN | 109635052 A | | 4/2019 | |
| CN | 110068330 A | | 7/2019 | |
| DE | 102016220249 A1 | | 4/2018 | |
| EP | 3 078 935 A1 | | 10/2016 | |
| EP | 3 324 209 A1 | | 5/2018 | |
| JP | 2019-533152 A | | 11/2019 | |
| WO | 2018/180097 A1 | | 10/2018 | |
| WO | WO-2020078572 A1 | * | 4/2020 | ............ G01C 21/32 |
| WO | WO-2021137483 A1 | * | 7/2021 | ........... G05D 1/0088 |

OTHER PUBLICATIONS

Hong Seokyong et al,, "Sliding Window-based Probabilistic Change Detection for Remote-sense Images", Procedia Computer Science, Elsevier, Amsterdam, NL, vol. 80, Jun. 1, 2016, pp. 2348-2352.

\* cited by examiner

METHOD, APPARATUS, DEVICE AND MEDIUM FOR DETECTING ENVIRONMENTAL CHANGE

FIELD

Embodiments of the present disclosure generally relate to the field of autonomous driving, and more specifically, to a method, an apparatus, a computing device and a computer readable storage medium for detecting an environmental change.

BACKGROUND

As an application scenario of the artificial intelligence, autonomous driving (also known as unmanned driving) has recently become a new direction for various transportation means, especially automobile industry. The autonomous driving technology usually relies on high-precision positioning of autonomous vehicles and the positioning depends on a positioning map which is built based on the physical environment around the driving path.

However, the physical environment around the driving path may change to varying degrees at all times, such as changes in vehicle flow and pedestrian flow, seasonal changes, construction, and so on. Among these environmental changes, some changes may have a small impact on laser positioning of autonomous driving, such as parking on the road or passing traffic; while some changes may have a large impact on laser positioning of autonomous driving, such as construction. Such environmental changes that affect laser positioning of autonomous driving need to be detected in order to remind and assist in updating the positioning map.

SUMMARY

Embodiments of the present disclosure provide a solution for detecting an environmental change.

In a first aspect of the present disclosure, there is provided a method for detecting an environmental change. The method comprises obtaining a global map for an area and a first local map built at a first time for a first sub-area in the area; and determining an environmental change in the first sub-area by comparing the first local map and the global map and determining a first probability of the environmental change.

In a second aspect of the present disclosure, there is provided an apparatus for detecting an environmental change. The apparatus comprises a first map obtaining module configured to a global map for an area and a first local map built at a first time for a first sub-area in the area; and an environmental change determining module configured to determine an environmental change in the first sub-area by comparing the first local map and the global map and determining a first probability of the environmental change.

In a third aspect of the present disclosure, there is provided a computing device comprising one or more processors; and a memory for storing one or more programs, wherein the one or more programs, when executed by the one or more processors, cause the computing device to perform the method according to the first aspect of the present disclosure.

In a fourth aspect of the present disclosure, there is provided a computer-readable storage medium having stored thereon a computer program that, when executed by a device, causes the device to perform the method according to the first aspect of the present disclosure.

It is to be understood that the content described in the Summary of the present disclosure is not intended to define key or essential features of embodiments of the present disclosure, nor is it intended to limit the scope of the present disclosure. Other features of the present disclosure will be easily understood by the following depictions.

BRIEF DESCRIPTION OF THE DRAWINGS

In conjunction with the accompanying drawings and with reference to the following detailed description, the above and other features, advantages, and aspects of embodiments of the present disclosure will become more apparent. In the drawings, identical or like reference numbers denote identical or like elements, in which.

DETAILED DESCRIPTION OF EMBODIMENTS

Figure 1:
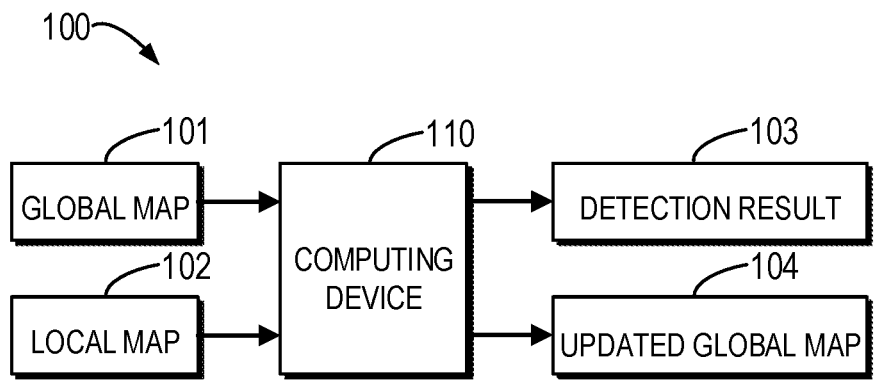
FIG. 1 illustrates a schematic diagram of an example environment in which embodiments of the present disclosure can be implemented.

Hereinafter, embodiments of the present disclosure will be described in more detail with reference to the accompanying drawings. Although some embodiments of the present disclosure are illustrated in the drawings, it is to be understood that the present disclosure may be implemented in various manners and should not be interpreted as being limited to the embodiments illustrated herein. On the contrary, these embodiments are only intended to understand the present disclosure more thoroughly and completely. It is to be understood that the accompanying drawings and embodiments of the present disclosure are only for the purpose of illustration, without suggesting any limitation to the protection scope of the present disclosure.

As described in embodiments of the present disclosure, the terms "includes", "comprises" and its variants are to be read as open-ended terms that mean "includes, but is not limited to." The term "based on" is to be read as "based at least in part on." The term "one embodiment" or "the embodiment" should be understood as "at least one embodiment". The terms "first", "second", etc. may refer to different or the same objects. The following text also can include other explicit and implicit definitions.

As discussed above, the autonomous driving technology usually relies on high-precision positioning of autonomous vehicles and the positioning depends on a positioning map which is built based on the physical environment around the driving path. However, the physical environment around the driving path may change to varying degrees at all times, such as changes in vehicle flow and pedestrian flow, seasonal changes, construction, and so on. Among these environmental changes, some changes may have a small impact on laser positioning of autonomous driving, such as parking on the road and passing traffic; while some changes may have a large impact on laser positioning of autonomous driving, such as construction. Such environmental changes that affect laser positioning of autonomous driving need to be detected in order to remind and assist in updating the positioning map.

According to embodiments of the present disclosure, there is proposed a solution for detecting an environmental change and updating a map. In this solution, a global map pre-built for a given area and a local map built in real time for a sub-area in a given area are obtained. A probability of an environmental change in the sub-area area is determined by comparing the local map and the global map. Whether the global map is to be updated can be determined based on respective probabilities of a plurality of sub-areas in the given area. In accordance with the determination that the global map is to be updated, the global map is updated by using at least part of the plurality of local maps. In this way, embodiments of the present disclosure can automatically detect environmental changes that affect the positioning of autonomous driving, thereby facilitating the updating of positioning maps.

Embodiments of the present disclosure will be specifically described below with reference to the drawings. FIG. 1 illustrates a schematic diagram of an example environment 100 in which embodiments of the present disclosure can be implemented. The environment 100 may include a computing device 110 comprising at least a processor, a memory, and other components generally present in a general-purpose computer, so as to implement functions such as computing, storage, communication, control and so on.

As shown in FIG. 1, the computing device 110 may obtain a global map 101 pre-built for a given area and a plurality of local maps 102 built in real time for a plurality of sub-areas in the given area. The computing device 110 may detect whether environments in the plurality of sub-areas change by comparing the local maps 102 with the global map 101. The computing device 110 may output a detection result 103 which indicates respective probabilities of environmental changes in the plurality of sub-areas. Additionally or alternatively, the computing device 110 may further determine whether the global map 101 is to be updated based on the respective probabilities of environmental changes in the plurality of sub-areas. In response to determining that the global map 101 is to be updated, the computing device 110 may update the global map 101 with at least part of the plurality of local maps 102 and output the updated global map 104.

Figure 2:
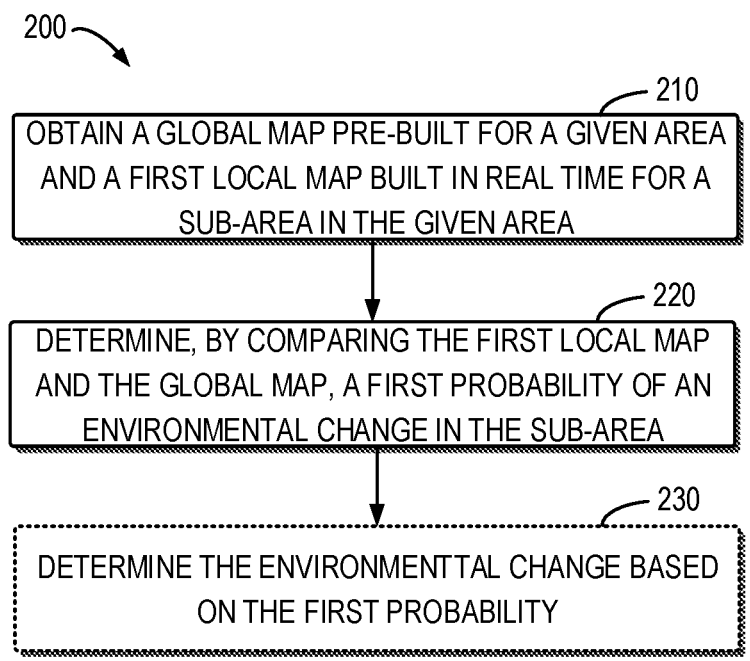
FIG. 2 illustrates a flowchart of a process for detecting an environmental change according to embodiments of the present disclosure.

FIG. 2 is a flowchart illustrating a process 200 for detecting an environmental change according to embodiments of the present disclosure. For ease of description, the process 200 will be described below with reference to FIG. 1. It is to be understood that the process 200 may also include an additional action not shown and/or omit some shown action, and the scope of the present disclosure is not limited in this regard.

At block 210, the computing device 110 obtains a global map 101 pre-built for a given area and a local map 102, also referred to as a "first local map," built in real time for a sub-area in a given area.

In some embodiments, the local map 102 may be built in a local coordinate system based on one or more frames of point cloud data collected in real time by a collection device, e.g., a vehicle equipped with a LiDAR, for sub-areas within the given area. The local coordinate system uses the initial position of the collection device as the origin, for example. Alternatively, in some embodiments, the local map 102 may be synthesized by a radar inertial odometer based on a plurality of frames of point cloud data for the sub-areas. As used herein, the "point cloud data" refers to data information of various points on the surface of an object returned when a laser beam is irradiated on the surface of the object in a sub-area, including position information and laser reflection information of each point. For example, the position information of each point may be represented by x, y and z coordinates, where the z coordinate corresponds to a height value of the point. The laser reflection information for each point can indicate laser reflection intensity, also called "reflection value," for the point.

In some embodiments, the global map 101 may be, for example, a two-dimensional occupancy grid map pre-built in a global coordinate system for the given area. For example, the global coordinate system is a world coordinate system indicating latitude and longitude. In some embodiments, the global map 101 may divide the given area into a plurality of grids and records position information and laser reflection information for points in each of the plurality of grids. In some embodiments, the global map 101 may record the mean of height values, and the mean and variance of laser reflection values for each of the plurality of grids.

At block 220, the computing device 110 determines a probability, e.g., as indicated by the detection result 103 in FIG. 1, of an environmental change in the sub-area by comparing the local map 102 and the global map 101.

In some embodiments, the computing device 110 may project the local map 102 into a plurality of grids corresponding to the global map 101, and then determine, from the plurality of grids, one or more grids hit by the local maps 102, for example, the one or more grids correspond to sub-areas corresponding to the local map 102. In some embodiments, prior to the projection, the computing device 110 may need to transform the local map 102 from the local coordinate system to the global coordinate system. Since the global map 101 is a rasterized map, points in the point cloud data corresponding to the local map 102 will be projected into the plurality of grids. In this manner, the computing device 110 can determine, from the plurality of grids, one or more grids corresponding to sub-areas associated with the local map 102.

In some embodiments, the computing device 110 may determine, from the global map 101, height information, for example, the mean of height values, and laser reflection information, for example, the mean and variance of laser reflection values, corresponding to the hit grid. In addition, the computing device 110 may determine which points of the point cloud data corresponding to the local map 102 are projected into the grid, and determine the height information (for example, the mean of height values) and laser reflection information, for example, the mean and variance of laser reflection values, corresponding to the grid based on respective height values and laser reflection values of these points. As used herein, the height information and laser reflection information from the local map 102 are referred to as "first height information" and "first laser reflection information", respectively; while the height information and laser reflection information from the global map 101 are referred to as "second height information" and "second laser reflection information", respectively.

In some embodiments, the computing device 110 may determine a difference, also referred to as a "first difference," between the first height information and the second height information and a difference, also referred to as a "second difference," between the first laser reflection information and the second laser reflection information:

$$z_s(r) = \frac{(u_s - u_m)^2(\sigma_s^2 + \sigma_m^2)}{\sigma_s^2 \sigma_m^2}, \quad (1)$$

$$z_s(a) = (a_s - a_m)^2,$$

where $u_s$, $\sigma_s$, $a_s$, $u_m$, $\sigma_m$, $a_m$ respectively represent the mean of reflection values, the variance of reflection values, and the mean of height values determined from the local map 102, and the mean of reflection values, the variance of reflection values, and the mean of height values determined from the global map 101. $z_s(r)$ represents the difference between the first laser reflection information and the second laser reflection information, and $z_s(a)$ represents the difference between the first height information and the second height information.

In some embodiments, the computing device 110 may determine the probability, also referred to as a "first probability," of an environmental change in the sub-area based on the first difference and the second difference. In some embodiments, the probability of the environmental change may be determined based on the following probability model:

$$P(d_s|z_s) = \eta P(d_s|z_s(r))^\gamma P(d_s|z_s(a))^{1-\gamma} \quad (2)$$

where $P(d_s|z_s(a))$ represents a conditional probability (also referred to as "first conditional probability") of a degree of environmental change with respect to the difference in the height information and $P(d_s|z_s(r))$ represents a conditional probability, also referred to as "second conditional probability," of a degree of environmental change with respect to the difference in the reflection information. $z_s$ represents the set of $z_s(r)$ and $z_s(a)$, and $P(d_s|z_s)$ represents a conditional probability of a degree of environmental change with respect to $z_s$. $\gamma$ represents a weight applied to the second conditional probability, $1-\gamma$ represents a weight applied to the first conditional probability and $\eta$ represents a predetermined adjustment coefficient. Because the height information difference and the reflection information difference can better identify the environmental changes that affect the laser positioning of autonomous driving, the probability of an environmental change in the sub-area can be determined more accurately based on both the height information difference and the reflection information difference.

In some embodiments, the computing device 110 may obtain a plurality of local maps built at different times for the same sub-area. For example, a local map collection device may collect multiple local maps for the same sub-area at different times. It is assumed here that the first local map obtained by the computing device 110 is constructed at a first time, and the computing device 110 may also obtain a second local map about the same sub-area constructed at a second time after the first time.

In some embodiments, after determining the first probability, in response to obtaining the second local map for the same sub-area, the computing device 110 may determine a second probability of an environmental change in the sub-area by comparing the second local map and the global map 101. It is to be understood that the determination of the second probability is similar to the determination of the first probability. The computing device 110 may then update the first probability based on the second probability. In some embodiments, the probability update can be performed based on the following formula:

$$l_t = l_{t-1} + \log\left(\frac{P(d_s|z_s)}{1 - P(d_s|z_s)}\right), \quad (3)$$

where t represents the time and t is a natural number, $l_t$ represents the logarithm of the likelihood ratio at time t and $l_0$ is equal to 0. In some embodiments, the environmental change probability $P_t$ at time t can be derived based on the following formula:

$$P_t = 1 - \frac{1}{1 + \exp(l_t)}, \quad (4)$$

It can be seen from the above formulas (3) and (4) that at the first time (that is, when t=1), the probability $P_1$ is equal to $P(d_s|z_s)$ determined at the first time; at the second time, when t=2), the probability $P_2$ will be determined based on both the logarithm of the likelihood ratio at the first time and $P(d_s|z_s)$ determined at the second time.

Alternatively, in other embodiments, the probability update may be performed in other manners, such as averaging or only replacing the environmental change probability determined earlier with the environmental change probability determined later, and so on. The scope of the present disclosure is not limited in this regard.

As shown in FIG. 2, optionally, at block 230, the computing device 110 determines the environmental change in the sub-area based on the first probability. In some embodiments, if the first probability exceeds a predetermined threshold, the computing device 110 may determine that the environmental change occurs in the sub-area. Otherwise, the computing device 110 may determine that the environmental change does not occur in the sub-area.

In this way, the computing device 110 can automatically detect environmental changes that affect the positioning of autonomous driving, thereby facilitating the update of the global positioning map.

Figure 3:
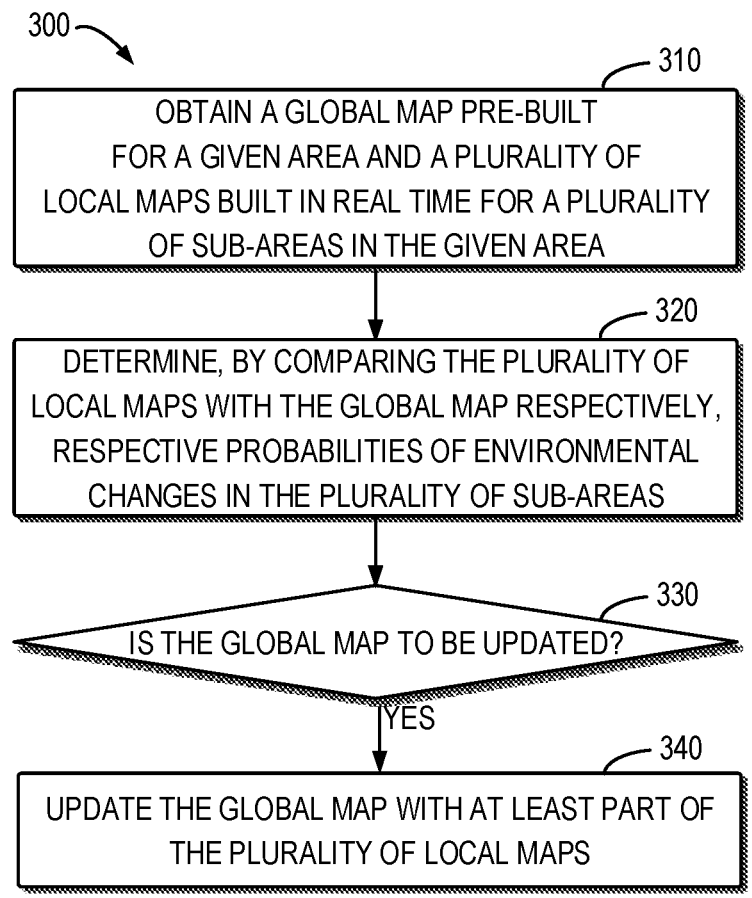
FIG. 3 illustrates a flowchart of a process for detecting an environmental change and updating a map according to embodiments of the present disclosure.

FIG. 3 illustrates a flowchart of a process 300 for detecting an environmental change and updating a map according to embodiments of the present disclosure. The process 300 may be implemented by the computing device 110 as shown in FIG. 1. For ease of discussion, the process 300 will be described with reference to FIG. 1. It is to be understood that the process 300 may also include an additional action not shown and/or omit some shown action, and the scope of the present disclosure is not limited in this regard.

At block 310, the computing device 110 obtains a global map 101 pre-built for a given area and a plurality of local maps 102 built in real time for a plurality of sub-areas in the given area.

At block 320, the computing device 110 determines respective probabilities of environmental changes in the plurality of sub-areas by comparing the plurality of local maps 102 with the global map 101 respectively.

It is to be understood that for each of the plurality of sub-areas, the computing device 110 may determine and/or update the probability of environmental change in the sub-area according to the process 200 as shown in FIG. 2, which will not be repeated here again.

At block 330, the computing device 110 determines whether the global map 101 is to be updated based on at least the determined respective probabilities.

In some embodiments, the computing device 110 may use the environmental change probabilities corresponding to the plurality of sub-areas to draw an environmental change probability heat map, in which different colors are used to indicate the level of the environmental change probability. In some embodiments, the computing device 110 may determine, from the plurality of sub-areas, such that a probability of an environmental change in each of the set of sub-areas exceeding a threshold probability. The computing device 110 may further determine whether a range of a connected area consisting of at least part of the set of sub-areas exceeds a threshold range. In some embodiments, when the distance between two sub-areas is below a threshold distance, the two sub-areas may be regarded as a connected area. In some embodiments, if the computing device 110 determines that the range of the connected area formed by at least part of the set of sub-areas exceeds the threshold range, the computing device 110 may determine that the global map 101 needs to be updated.

At block 340, in response to determining that the global map 101 is to be updated, the computing device 110 updates the global map 101 with at least part of the plurality of local maps 102, for example, to derive the updated global map 104 as shown in FIG. 1.

In some embodiments, the computing device 110 may determine at least part of local maps corresponding to the connected area from the plurality of local maps 102, and then update the global map 101 with the determined at least part of local maps. It is to be understood that the global map 101 may be updated with the determined at least part of local maps based on any method currently known or to be developed in the future. The scope of the present disclosure is not limited in this regard.

In this way, by detecting environmental changes that affect the positioning of autonomous driving, the computing device 110 can facilitate a local automated update of the global positioning map based on the detection result. Because the updated global positioning map can better reflect the real environment around the driving path, it can better serve laser positioning in autonomous driving.

Figure 4:
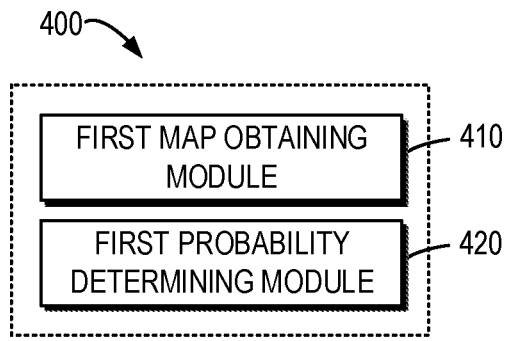
FIG. 4 illustrates a schematic block diagram of an apparatus for detecting an environmental change according to embodiments of the present disclosure.

FIG. 4 illustrates a schematic block diagram of an apparatus 400 for detecting an environmental change according to embodiments of the present disclosure. The apparatus 400 may be included in or implemented as the computing device 110 as shown in FIG. 1. As shown in FIG. 4, the apparatus 400 comprises a first map obtaining module 410 configured to obtain a global map pre-built for a given area and a first local map built in real time for a sub-area in the given area. The apparatus 400 comprises a first probability determining module 420 configured to determine, by comparing the first local map and the global map, a first probability of an environmental change in the sub-area.

In some embodiments, the first local map is built based on point cloud data indicating first height information and first laser reflection information about a plurality of points in the sub-area obtained by irradiating the plurality of points with a laser, the global map divides the given area into a plurality of grids and records height information and laser reflection information for points in each of the plurality of grids. In some embodiments, the first probability determining module 420 comprises: a first determination unit configured to determine, from the plurality of grids, a grid corresponding to the sub-area by projecting the first local map into the plurality of grids; a second determination unit configured to determine, from the global map, second height information and second laser reflection information corresponding to the grid; a third determination unit configured to determine a first difference between the first height information and the second height information and a second difference between the first laser reflection information and the second laser reflection information; and a fourth determination unit configured to determine the first probability based on the first difference and the second difference.

In some embodiments, the fourth determination unit comprises: a first determination subunit configured to determine, based on the first difference, a first conditional probability of the environmental change; a second determination subunit configured to determine, based on the second difference, a second conditional probability of the environmental change; and a third determination subunit configured to determine the first probability based on at least the first conditional probability and the second conditional probability.

In some embodiments, the apparatus further comprises: a second map obtaining module configured to obtain a second local map built in real time for the sub-area, the second local map being built later than the first local map; a second probability determining module configured to determine, by comparing the second local map and the global map, a second probability of the environmental change; and a probability updating module configured to update the first probability based on the second probability.

In some embodiments, the given area comprises a plurality of sub-areas including the sub-area and at least one other sub-area. The apparatus 400 further comprises: a third obtaining module configured to obtain at least one local map built in real time for the at least one other sub-area; a third probability determining module configured to determine, by comparing the at least one local map with the global map respectively, respective probabilities of environmental changes in the at least one other sub-area; an update determining module configured to determine whether the global map is to be updated based on at least the first probability and the respective probabilities of environmental changes in the at least one other sub-area; and a map updating module configured to in response to determining that the global map is to be updated, update the global map with at least part of the first local map and the at least one local map.

In some embodiments, the update determining module comprises: a fifth determination unit configured to determine a set of sub-areas from the plurality of sub-areas, a probability of an environmental change in each of the set of sub-areas exceeding a threshold probability; and a sixth determination unit configured to in response to a range of a connected area consisting of at least part of the set of sub-areas exceeding a threshold range, determine that the global map is to be updated.

In some embodiments, the map updating module comprises: a seventh determination unit configured to determine, from the first local map and the at least one local map, at least part of local maps corresponding to the connected area; and an updating unit configured to update the global map with the at least part of local maps.

Figure 5:
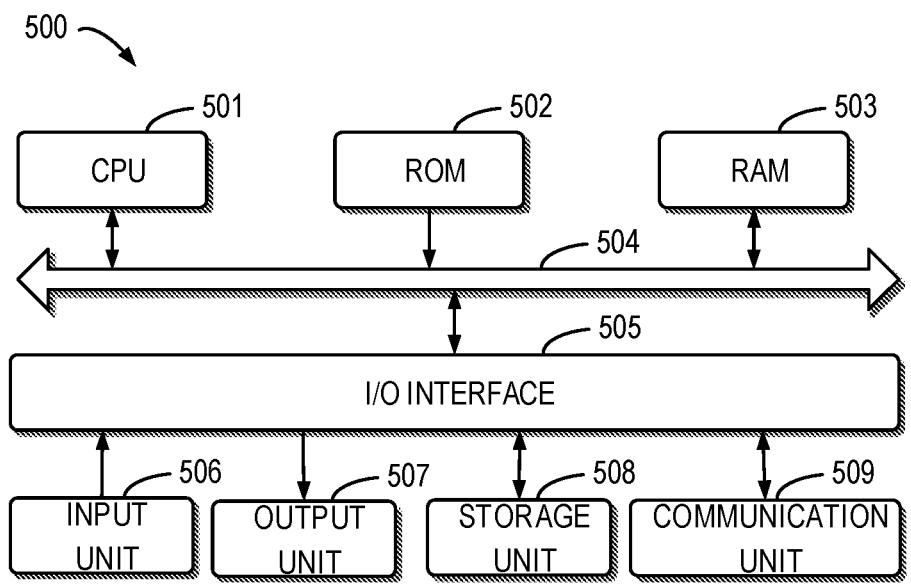
FIG. 5 illustrates a schematic block diagram of a computing device capable of implementing embodiments of the present disclosure.

FIG. 5 shows a schematic block diagram of an example device 500 that may be used to implement embodiments of the present disclosure. The device 500 may be used to implement the computing device 110 as shown in FIG. 1. As shown, the device 500 comprises a central processing unit (CPU) 501 which is capable of performing various proper actions and processes in accordance with computer program instructions stored in a read only memory (ROM) 502 and/or computer program instructions uploaded from a storage unit 508 to a random access memory (RAM) 503. In the RAM 503, various programs and data needed in operations of the device 500 may be stored. The CPU 501, the ROM 502 and the RAM 503 are connected to one another via a bus 504. An input/output (I/O) interface 505 is also connected to the bus 504.

Multiple components in the device 500 are connected to the I/O interface 505: an input unit 506 including a keyboard, a mouse, or the like; an output unit 507, e.g., various displays and loudspeakers; a storage unit 508 such as a magnetic disk, an optical disk or the like; and a communication unit 509 such as a network card, a modem, or a radio communication transceiver. The communication unit 509 allows the apparatus 500 to exchange information/data with other devices via a computer network such as Internet and/or various telecommunication networks.

The processing unit 501 performs various methods and processes described above, such as the processes 200 and/or 300. For example, in some embodiments, the processes 200 and/or 300 may be implemented as a computer software program that is tangibly embodied on a machine-readable medium, such as the storage unit 508. In some embodiments, part or all of the computer program may be loaded and/or installed on the device 500 via the ROM 502 and/or the communication unit 509. When a computer program is loaded into the RAM 503 and executed by the CPU 501, one or more steps of the processes 200 and/or 300 described above may be performed. Alternatively, in other embodiments, the CPU 501 may be configured to perform the processes 200 and/or 300 by any other suitable means (e.g., by means of firmware).

The functions described above herein may be performed, at least in part, by one or more hardware logic components. For example, without limitation, exemplary types of hardware logic components that may be used include: Field Programmable Gate Array (FPGA), Application Specific Integrated Circuit (ASIC), Application Specific Standard Product (ASSP), System on Chip (SOC), Load programmable logic device (CPLD) and so on.

The computer program code for implementing the method of the present disclosure may be complied with one or more programming languages. These computer program codes may be provided to a general-purpose computer, a dedicated computer or a processor of other programmable data processing apparatuses, such that when the program codes are executed by the computer or other programmable data processing apparatuses, the functions/operations prescribed in the flow chart and/or block diagram are caused to be implemented. The program code may be executed completely on a computer, partly on a computer, partly on a computer as an independent software packet and partly on a remote computer, or completely on a remote computer or server.

In the context of the present disclosure, the machine-readable medium may be any tangible medium including or storing a program for or about an instruction executing system, apparatus or device. The machine-readable medium may be a machine-readable signal medium or machine-readable storage medium. The machine-readable medium may include, but not limited to, electronic, magnetic, optical, electro-magnetic, infrared, or semiconductor system, apparatus or device, or any appropriate combination thereof. More detailed examples of the machine-readable storage medium include, an electrical connection having one or more wires, a portable computer magnetic disk, hard drive, random-access memory (RAM), read-only memory (ROM), erasable programmable read-only memory (EPROM or flash memory), optical storage device, magnetic storage device, or any appropriate combination thereof.

Besides, although the operations are depicted in a particular order, it should not be understood that such operations are completed in a particular order as shown or in a successive sequence, or all shown operations are executed so as to achieve a desired result. In some cases, multi-task or parallel-processing would be advantageous. Likewise, although the above discussion includes some specific implementation details, they should not be explained as limiting the scope of any disclosure, but should be explained as a description for a particular implementation of a particular disclosure. In the present description, some features described in the context of separate embodiments may also be integrated into a single implementation. On the contrary, various features described in the context of a single implementation may also be separately implemented in a plurality of embodiments or in any suitable sub-group.

Although the subject matter has been described in language specific to structural features and/or methodological actions, it should be understood that the subject matters specified in the appended claims are not limited to the specific features or actions described above. Rather, the specific features and actions described above are disclosed as example forms of implementing the claims.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A method, comprising:
   obtaining a global map for an area and a first local map built at a first time for a first sub-area in the area; and
   determining an environmental change in the first sub-area by comparing the first local map and the global map and determining a first probability of the environmental change,
   wherein the first local map is built based on point cloud data including first height information and first laser reflection information about a first plurality of points in the first sub-area,
   wherein the global map divides the area into a plurality of grids each containing a plurality of points and records height information and laser reflection information for the plurality of point in each of the plurality of grids, and
   wherein the determining the first probability includes:
      determining, from the plurality of grids, a grid corresponding to the first, sub-area by projecting the first local map into the plurality of grids;
      determining, from the global map, second height information and second laser reflection information of the plurality of points in the grid;
      determining a first difference between the first height information and the second height information and a second difference between the first laser reflection information and the second laser reflection information; and
      determining the first probability based on the first difference and the second difference.

2. The method of claim 1, wherein the determining the first probability comprises:
   determining, based on the first difference, a first conditional probability of the environmental change;
   determining, based on the second difference, a second conditional probability of the environmental change; and determining the first probability based on at least the first conditional probability and the second conditional probability.

3. The method of claim 1, further comprising:
obtaining a second local map built at a second time for the first sub-area, the second time being later than the first time;
determining, by comparing the second local map and the global map, a second probability of the environmental change; and
updating a probability of the environmental change based on the second probability.

4. The method of claim 1, wherein the area comprises a plurality of sub-areas including the first sub-area and at least one second sub-area, and the method further comprises:
obtaining at least one third local map built for the at least one second sub-area;
determining, by comparing the at least one third local map with the global map respectively, respective third probability of environmental change in each of the at least one second sub-area;
determining whether the global map is to be updated based on at least the first probability and the respective third probability of environmental change in the at least one second sub-area; and
in response to determining that the global map is to be updated, updating the global map with at least part of the first local map and the at least one third local map.

5. The method of claim 4, wherein the determining whether the global map is to be updated comprises:
determining a set of sub-areas from the plurality of sub-areas, wherein a probability of an environmental change in each of the set of sub-areas exceeds a threshold probability; and
in response to a dimension of a connected area that contains at least part of the set of sub-areas exceeding a threshold dimension, determining that the global map is to be updated.

6. The method of claim 5, wherein the updating the global map comprises:
determining, from the first local map and the at least one third local map, at least part of local maps corresponding to the connected area; and
updating the global map with the at least part of local maps.

7. A computing device, comprising:
one or more processors; and
a memory for storing one or more programs, wherein the one or more programs, when executed by the one or more processors, cause the computing device to perform acts comprising:
obtaining a global map for an area and a first local map built at a first time for a first sub-area in the area; and
determining an environmental change in the first sub-area by comparing the first local map and the global map and determining a first probability of the environmental change,
wherein the first local map is built based on point cloud data including first height information and first laser reflection information about a first plurality of points in the first sub-area,
wherein the global map divides the area into a plurality of grids each containing a plurality of points and records height information and laser reflection information for the plurality of points in each of the plurality of grids, and wherein the determining the first probability includes:
determining, from the plurality of grids, a grid corresponding to the first sub-area by projecting the first local map into the plurality of grids;
determining, from the global map, second height information and second laser reflection information of the plurality of points in the grid;
determining a first difference between the first height information and the second height information and a second difference between the first laser reflection information and the second laser reflection information; and
determining the first probability based on the first difference and the second difference.

8. The computing device of claim 7, wherein the determining the first probability comprises:
determining, based on the first difference, a first conditional probability of the environmental change;
determining, based on the second difference, a second conditional probability of the environmental change; and
determining the first probability based on at least the first conditional probability and the second conditional probability.

9. The computing device of claim 7, wherein the acts further comprise:
obtaining a second local map built at a second time for the first sub-area, the second time later than the first time;
determining, by comparing the second local map and the global map, a second probability of the environmental change; and
updating a probability of the environmental change based on the second probability.

10. The computing device of claim 7, wherein the area comprises a plurality of sub-areas including the first sub-area and at least one second sub-area, and the acts further comprise:
obtaining at least one third local map built for the at least one second sub-area;
determining, by comparing the at least one third local map with the global map respectively, respective third probability of environmental change in each of the at least one second sub-area;
determining whether the global map is to be updated based on at least the first probability and the respective third probability of environmental change in the at least one second sub-area; and
in response to determining that the global map is to be updated, updating the global map with at least part of the first local map and the at least one third local map.

11. The computing device of claim 10, wherein the determining whether the global map is to be updated comprises:
determining a set of sub-areas from the plurality of sub-areas, wherein a probability of an environmental change in each of the set of sub-areas exceeds a threshold probability; and
in response to a dimension of a connected area that contains at least part of the set of sub-areas exceeding a threshold dimension, determining that the global map is to be updated.

12. The computing device of claim 11, wherein the updating the global map comprises:
determining, from the first local map and the at least one third local map, at least part of local maps corresponding to the connected area; and updating the global map with the at least part of local maps.

13. A computer-readable storage medium having stored thereon a computer program that, when executed by a device, causes the device to perform acts comprising:
   obtaining a global map for an area and a first local map built at a first time for a first sub-area in the area; and
   determining an environmental change in the sub-area by comparing the first local map and the global map and determining a first probability of the environmental change,
   wherein the first local map is build based on point cloud data including first height information and first laser reflection information about a plurality of points in the first sub-area,
   wherein the global map divides the area into a plurality of grids each containing a plurality of points and records height information and laser reflection information for the plurality of points in each of the plurality of grids, and
   wherein the determining the first probability includes;
   determining, from the plurality of grids, a grid corresponding to the first sub-area by projecting the first local map into the plurality of grids;
      determining, from the global map, second height information and second laser reflection information of the plurality of points in the grid;
      determining a first difference between the first height information and the second height information and a second difference between the first laser reflection information and the second laser reflection information; and
      determining the first probability based on the first difference and the second difference.

14. The computer-readable storage medium of claim 13, wherein the determining the first probability comprises:
   determining, based on the first difference, a first conditional probability of the environmental change;
   determining, based on the second difference, a second conditional probability of the environmental change; and
   determining the first probability based on at least the first conditional probability and the second conditional probability.

15. The computer-readable storage medium of claim 13, wherein the acts further comprise:
   obtaining a second local map built at a second time for the first sub-area, the second time later than the first time;
   determining, by comparing the second local map and the global map, a second probability of the environmental change; and
   updating a probability of the environmental change based on the second probability.

16. The computer-readable storage medium of claim 13, wherein the area comprises a plurality of sub-areas including the first sub-area and at least one second sub-area, and the acts further comprise:
   obtaining at least one third local map built for the at least one second sub-area;
   determining, by comparing the at least one third local map with the global map respectively, respective third probability of environmental change in each of the at least one second sub-area;
   determining whether the global map is to be updated based on at least the first probability and the respective third probability of environmental change in each of the at least one second sub-area; and
   in response to determining that the global map is to be updated, updating the global map with at least part of the first local map and the at least one third local map.

17. The computer-readable storage medium of claim 16, wherein the determining whether the global map is to be updated comprises:
   determining a set of sub-areas from the plurality of sub-areas, wherein a probability of an environmental change in each of the set of sub-areas exceeds a threshold probability; and
   in response to a dimension of a connected area that contains at least part of the set of sub-areas exceeding a threshold dimension, determining that the global map is to be updated.

* * * * *

UNITED STATES PATENT AND TRADEMARK OFFICE
CERTIFICATE OF CORRECTION

PATENT NO. : 11,466,992 B2
APPLICATION NO. : 16/806445
DATED : October 11, 2022
INVENTOR(S) : Shenhua Hou et al.

Page 1 of 1

It is certified that error appears in the above-identified patent and that said Letters Patent is hereby corrected as shown below:

In the Claims

Column 10, Claim 1, Line 45:
"the plurality of point in each"
Should read:
--the plurality of points in each--.

Column 10, Claim 1, Line 49:
"to the first, sub-area by"
Should read:
--to the first sub-area by--.

Column 13, Claim 13, Line 12:
"map is build based on"
Should read:
--map is built based on--.

Column 13, Claim 13, Lines 21-22:
"probability includes; determining,
Should read:
--probability includes: determining,--.

Signed and Sealed this
Twenty-sixth Day of November, 2024

Katherine Kelly Vidal
*Director of the United States Patent and Trademark Office*